Nov. 30, 1965  R. NEUSCHOTZ  3,220,454
THREADED INSERT HAVING EXPANDABLE SERRATED LOCKING PORTION
Filed Oct. 8, 1964  3 Sheets-Sheet 1
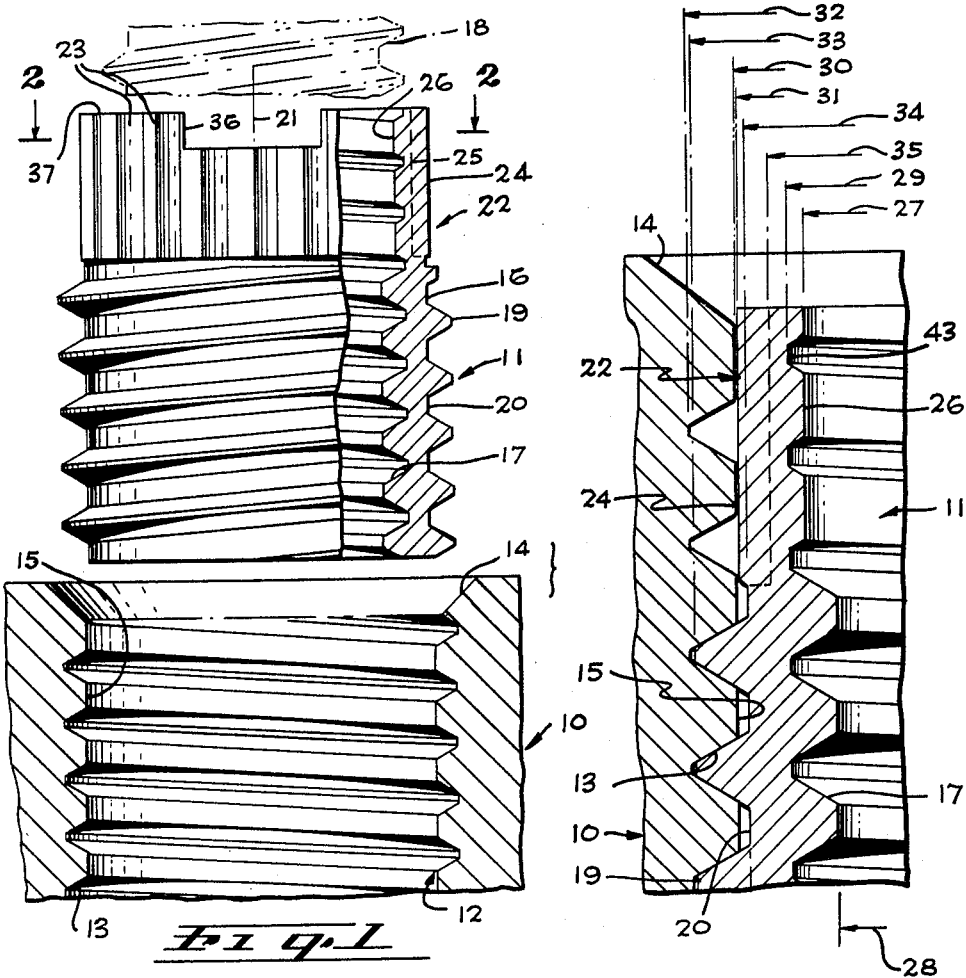
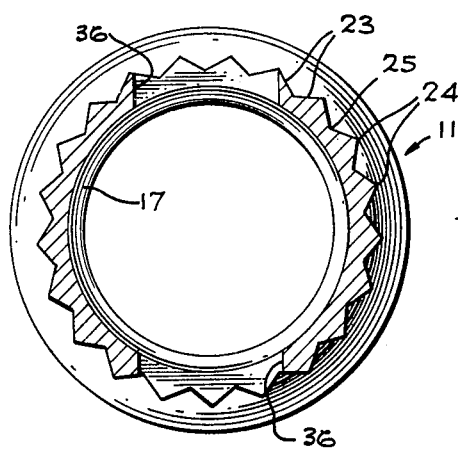
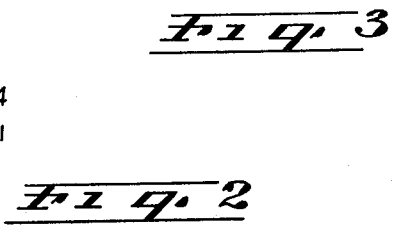
ROBERT NEUSCHOTZ
INVENTOR.
BY William P. Green
ATTORNEY

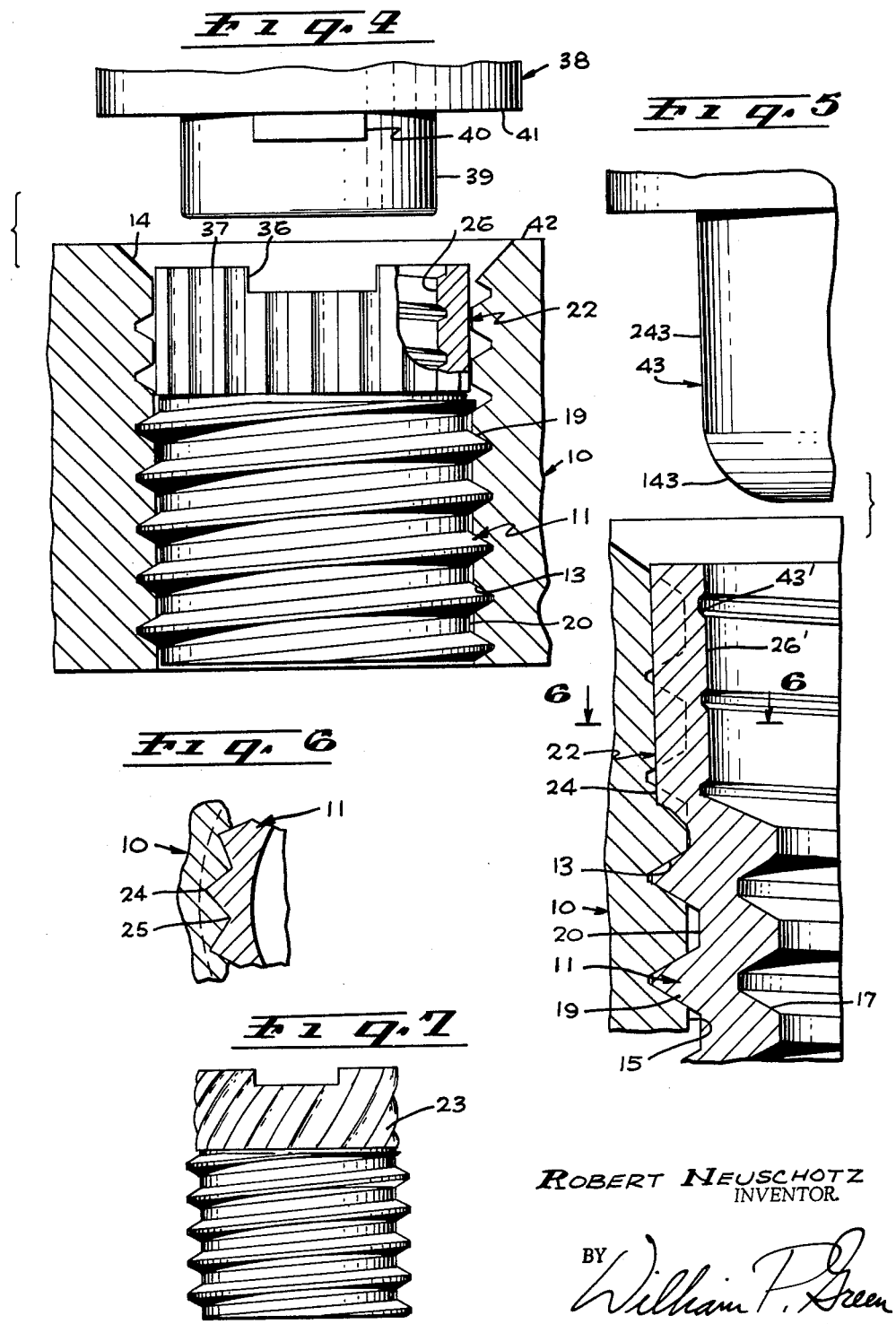

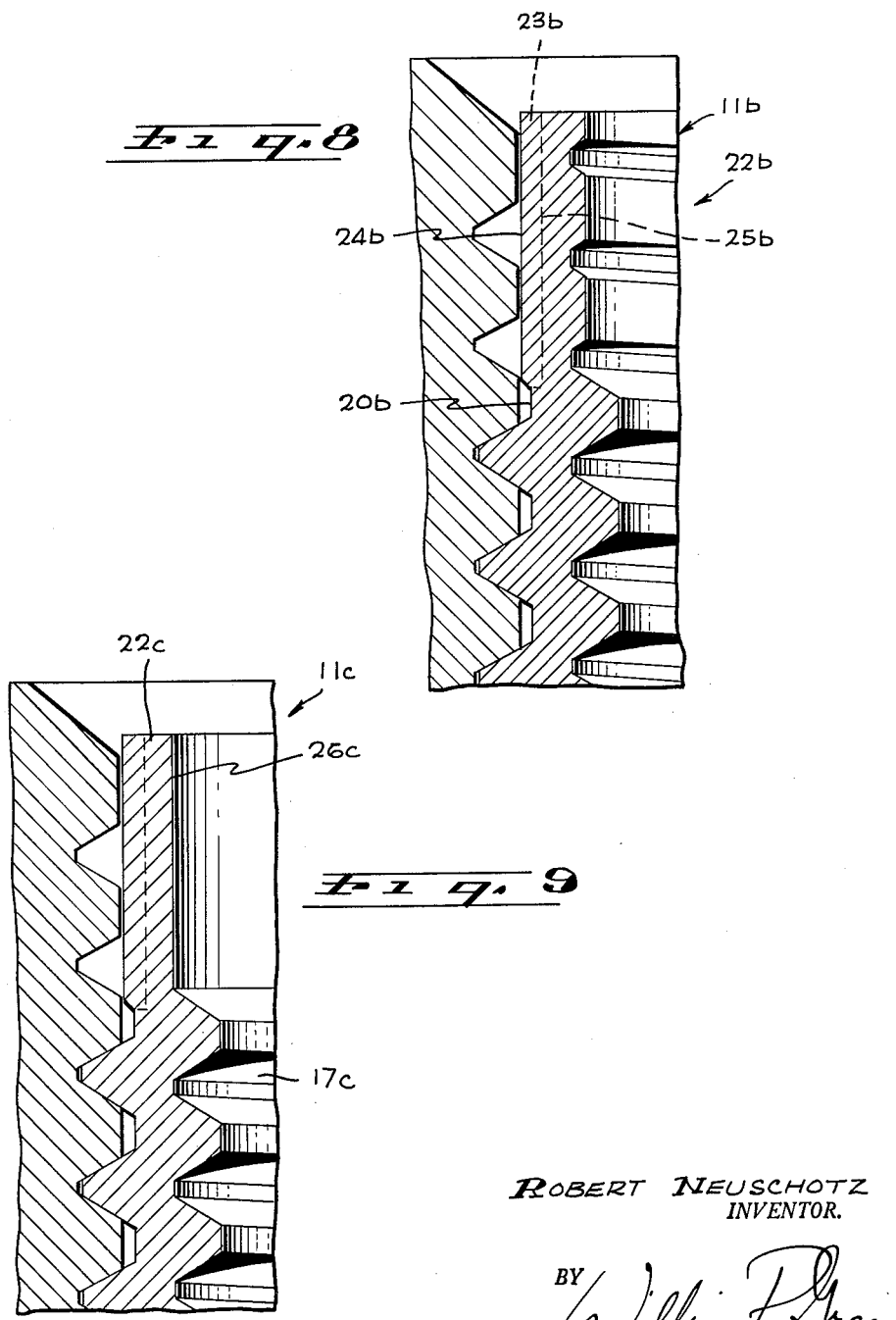

United States Patent Office 3,220,454
Patented Nov. 30, 1965

3,220,454
THREADED INSERT HAVING EXPANDABLE
SERRATED LOCKING PORTION
Robert Neuschotz, 1162 Angelo Drive,
Beverly Hills, Calif.
Filed Oct. 8, 1964, Ser. No. 402,379
12 Claims. (Cl. 151—41.72)

This application is a continuation-in-part of my application Serial Number 326,074, filed November 26, 1963, on "Thin Walled Threaded Elements" which is now abandoned. The invention covered by the present application relates to an improved threaded insert, having external threads to be screwed into a carrier part, and preferably also having internal threads to which a screw or stud may be connected. My copending application Serial Number 326,092, entitled "Method Of Installing Thin Walled Threaded Element," filed November 26, 1963, is directed to certain features of novelty residing in the method of installation of an insert embodying the present invention.

Certain features of the invention are especially applicable to inserts of the type known as thin walled inserts, in which the sizes of the internal and external threads are very close together, so that the thickness of the wall between these two threads is very small. Such inserts are desirable for weight reduction purposes, and to enable the use of inserts in situations where space is very limited. The invention will be discussed primarily as applied to such thin walled inserts, though it is to be understood that the teachings of the invention may of course also be applied to inserts having thicker walls.

An insert of the invention has an externally serrated locking portion which is expandable radially outwardly against the wall of the carrier part to grip or bite into that carrier part in a manner locking the insert against unscrewing rotation, and thereby effectively locking the insert in the carrier part or parent material. There have in the past been devised certain expandible inserts of this type, but these prior expedients have had various extremely bothersome disadvantages which have limited their use. In particular, one important disadvantage has resided in the fact that prior expandible inserts have required the provision in the carrier part of a very critically dimensioned counterbore, specially designed for reception of and engagement by the locking portion of the insert. It has been required that this counterbore be of a precisely controlled diameter, and be of a very precisely controlled depth into the carrier part, and unless these dimensions were maintained, the insert could not effectively serve its purpose. The cost of providing both this counterbore and the insert engaging threads within each opening in a carrier part which is to receive an insert has greatly increased the cost if installation of the inserts. In addition, the ultimate locking effectiveness has been less than would be desired.

A major object of the present invention is to provide an expandable and preferably thin walled insert which can actually be installed within a threaded passage which has no counterbore, and has no other specialized configuration adapting it for reception of the insert. Thus, in order to prepare a hole for reception of an insert of the present type, it is necessary merely to drill the hole, and then tap it by conventional tapping tool to form threads along its entire length.

To attain this result, I provide a locking portion having serrations which are received primarily within, and preferably substantially entirely within, a diameter corresponding to the minor diameter of the carrier part threads into which the insert is to be screwed. For this purpose, these serrations have a maximum diameter which is substantially less than the major diameter of the external threads of the insert itself. The minor diameter of the insert threads is preferably a modified diameter, and the minimum diameter or valley portions of the serrations are desirably at a diameter which is substantially smaller than this modified minor diameter of the external threads, with the peaks preferably being greater in diameter than the modified minor diameter of the external threads.

Within the locking portion, there is desirably a counterbore to be engaged by an expanding tool for expanding the locking portion against the threads of the carrier part. This counterbore is at a greater diameter than the minor diameter of the internal threads, and is preferably between the minor and major diameter of these threads with the internal threads continuing through the location of the counterbore but being truncated by that counterbore. These truncated threads at the location of the counterbore thus strengthen the preferably circularly continuous locking portion, to prevent rupture thereof upon expansion. Thus, the discussed dimensional relationships between the serrations, the counterbore, and internal and external thread diameters, enable the formation of a locking portion which is capable or reception within the very small radial thickness allowed in a thin walled insert, without detracting from the locking effectiveness of the device.

An additional object of the invention is to provide an expansible thin walled insert which can be locked in place with less expansion than prior similar devices, and which can therefore be formed of less expansive materials without danger of cracking.

The above and other features and objects of the invention will be better understood from the following detailed description of the typical embodiments illustrated in the accompanying drawings, in which:

FIG. 1 is a side view, partially broken away, of an insert of the type with which the present invention is concerned, showing the insert prior to installation within a carrier part;

FIG. 2 is a transverse section taken on line 2—2 of FIG. 1;

FIG. 3 is a fragmentary greatly enlarged axial section through a portion of the FIG. 1 insert;

FIG. 4 shows the insert being screwed into the carrier part, but before expansion of its locking portion;

FIG. 5 is an enlarged fragmentary axial section through the insert after expansion to locking condition;

FIG. 6 is a section on line 6—6 of FIG. 5;

FIG. 7 shows a variational form of the invention; and

FIGS. 8 and 9 are views similar to FIG. 3, but showing two additional forms of the invention.

Referring first to FIG. 1, I have shown at 10 a carrier part into which an insert 11 is to be screwed. The carrier part has a passage 12 containing internal threads 13 which may be of uniform diameter along their entire length. A short tapering countersink 14 may be provided at the axially outer end of the threaded bore. As seen best in FIG. 3, the threads 13 may be of conventional 60 degree configuration (i.e. defining a 60 degree included angle between opposite side surfaces of a thread), and may be of a standard size, but with somewhat modified minor diameter axially extending surfaces 15.

Insert 11 has a generally tubular body 16, typically formed of steel or other metal, and containing internal threads 17 for threadedly receiving a mating screw represented at 18. Externally, insert body 16 has threads 19 configured to mate with and screw into the internal threads 13 formed in carrier part 10. When the insert is of a thin wall type, internal threads 17 of the insert are of a size very close to the size of external threads 19, so that the resulting thickness of the side wall of the insert, between the major diameter of the internal threads and the minor diameter of the external threads, is very small. More particularly, the external threads are in most instances a single size larger than the internal threads (referring of course to standard thread sizes), or in the smaller inserts preferably two standard sizes apart. In order to maximize the thickness of the insert wall, for any two selected internal and external thread sizes, the external threads 19 have modified minor diameter surfaces 20, which are spaced radially outwardly farther than would be the normal minor diameters of standard threads otherwise having the same configuration as threads 19. As will be apparent, modified minor diameter surfaces 20 are preferably substantially exactly cylindrical in shape, and extend directly parallel to the main axis 21 of the insert.

At its axially outer end (upper end in FIG. 1), insert 11 has a locking portion 22 which is adapted to be expanded radially outwardly against some of the carrier part threads to form a lock therewith. This portion 22 is tubular and circularly continuous, and is externally knurled to form a series of axially extending circularly spaced serrations or knurls 23. As best seen in FIG. 2, each of these serrations may taper radially outwardly to an outer peak 24, with reduced thickness and reduced external diameter valleys 25 formed circularly between these serrations or peaks. The various serrations may all be identical, and may be uniform in cross section along their entire axial length. Thus, the peaks 24 form axially extending essentially sharp edges capable of biting into the internal threads of the carrier part in locking relation.

Internally, locking portion 22 of the insert contains a counterbore 26 which may be cylindrically disposed about axis 21 of the insert, and which preferably is at a diameter 27 which is substantially greater than the minor diameter 28 of internal threads 17. Preferably, the diameter 27 of the counterbore is less than the major diameter 29 of internal threads 17, with the threads 17 being continued upwardly through counterbore 26, but being truncated thereby, as will be apparent from FIG. 3. For best results, it is found desirable that the radial height of the internal threads which are truncated by counterbore surface 26 be between about one half and one fifth of the radial height of the rest of the internal threads which are not truncated by the counterbore.

In order to enable the insert to be screwed into threaded bore 13, serrations 23 are formed to be located primarily within, and preferably substantially entirely within the diameter 30 of minor diameter surfaces 15 of carrier part threads 13. This relationship is brought out best in FIG. 3, which indicates that for optimum results the peak or maximum diameter portions 24 of the serrations are substantially equal to or very slightly smaller than minor diameter 30 of the carrier part threads, to be close fits within those threads. To allow this, the diameter 31 of serration peaks 24 must be substantially smaller than the major diameter 32 of carrier part threads 13, and substantially smaller than major diameter 33 of external threads 19 of the insert. In addition, it is preferred that the diameter 31 of serration peaks 24 be greater than the modified minor diameter 34 of external threads 19 of the insert, but much closer to the modified minor diameter 34 than to major diameter 33 of the threads. With regard to the valley portions 25 of the serrations, the diameter 35 of these valley portions should be substantially less than the minor diameter 34 of the external threads of the insert, and substantially greater than the major diameter 29 of the internal threads of the insert, and of course greater than the diameter of counterbore 26.

For initially screwing the insert into the carrier part, locking portion 22 may have one or more driving notches 36 (typically two diametrically opposite notches), which may have the rectangular shape shown in FIG. 1, and which notches extend axially inwardly from and beyond a transverse annular planar end surface 37 of the insert.

To now describe the method of installation of the insert of FIGS. 1 through 6, the first step in such installation is to screw the insert into carrier part 10 from the position of FIG. 1 to the position of FIG 4. This may be attained by any suitable driving tool, which, if drive recesses of the type shown at 36 are provided in the insert, may typically take the form of the tool shown at 38 in FIG. 4, having a pilot portion 39 receivable within the threaded bore of the insert, and having two teeth 40 positioned to be received within drive notches 36 of the insert in a relation turning the insert into the carrier part recess. When the insert reaches the fully installed position of FIG. 4, engagement of annular surface 41 of the tool 38 with outer surface 42 of the carrier part prevents further advancement of the tool, so that the insert then advances only far enough to move out of engagement with driving teeth 40, and thus reach the position of FIG. 4 in which the outer surface of the insert is located slightly inwardly of the outer surface of the carrier part.

After the insert has reached the FIG. 4 position, locking portion 22 of the insert is expanded outwardly from the position of FIG. 3 to the position of FIG. 5, by means of an essentially cylindrical expanding tool such as that shown at 43 in FIG. 5. This expanding tool has a lower rounded annular portion 143, and an essentially cylindrical portion 243 thereabove (desirably very slightly tapered or frustro-conical as shown). The tool is forced downwardly into counterbore 26, and by reason of the annular rounded lower end 143 of the tool acts to flare or annularly expand locking portion 22 outwardly to the position of FIG. 5, in which portion 22 is still circular but at an increased diameter corresponding to that of portion 243 of the tool, so that serrations 23 bite into the radially opposed turns of carrier part threads 13, to attain a very effective self locking action preventing unscrewing rotation of the insert from the carrier part. The fact that the serrations extend axially causes them to cut transversely across the length of the individual turns of threads 13 (whose length of course extends circularly about axis 21), so that the resulting crossed or transverse relationship between the serrations and the engaged threads maximizes the locking effectiveness of the portion 22. Since the portion of the carrier part into which the serrations are expanded is threaded, rather than being a straight cylindrical counterbore as in some prior devices, the expansion may be attained with a minimum expanding force, while the portions of the carrier part threads which are deformed by expansion of the serrations may be forced into the thread grooves of the carrier part to further lock the serrations and insert against rotation. Additionally, expansion of the locking serrations into threads of the carrier part, rather than into a straight counterbore, reduces the tendency to create outward stresses in the carrier part, by allowing the metal of the carrier part threads to cold-flow into the spaces between threads.

It is noted that counterbore surfaces 26 within the insert should be expanded radially outwardly at least as far as the major diameter 29 of the internal threads of the insert, and preferably considerably outwardly beyond that diameter, as to the position represented at 26' in FIG. 5. Such expansion will normally result in a reduction in depth of the small thread grooves 43 to the condition shown at 43' in FIG. 3, but these distorted grooves and threads within the interior of the locking portion are expanded to a great enough diameter that they normally will not contact or interfere in any way with engagement of screw 18 with the internal threads 17.

The truncated or partial threads formed by counterbore 26 assist in strengthening the essentially annular upper locking portion of the insert, so that in spite of the very thin walled structure of the insert, and in spite of the fact that the serrations are received within the minor diameter of the carrier part threads, the wall of locking portion 22 still has sufficient strength to resist rupture or tearing by the expanding forces encountered upon actuation to locking condition. Therefore, after expansion, the locking portion 22 is still circularly continuous, even at the minimum thickness locations of valleys 25 between the serrations, with sufficient strength at these reduced thickness locations to coact with the other portions of locking structure 22 in maintaining the peaks in the expanded locking position of FIG. 5.

FIG. 7 shows another form of insert which is the same as that of FIG. 1, with the same dimensional relationships, except that the serrations 23a extend somewhat diagonally or helically, rather than directly axially.

To specify more particularly the dimensional relationships of a typical insert embodying the teachings of FIGS. 1 through 6, an effective insert having 10-32 internal threads and modified ¼-28 external threads may incorporate the following specific dimensions:

|  | Inch |
|---|---|
| Minor diameter 28 of internal threads | .160 |
| Counterbore diameter 27 | .178 |
| Major diameter 29 of internal threads | .193 |
| Minimum diameter 35 of serrations | .201 |
| Modified minor diameter of external threads | .214 |
| Peak diameter 31 of serrations (and minor diameter 30 of carrier part thread) | .221 |
| Major diameter 33 of external thread | .250 |
| Major diameter 32 of carrier part thread | .253 |

In actual manufacture of an insert having the above specified nominal dimensions, tolerances must of course be allowed, and the dimensions may therefore vary a few thousandths from those given. It is found that cumulative tolerances may result in the maximum diameter 31 of serrations 23 being very slightly greater (a few thousandths greater) than the minor diameter 30 of the carrier part threads, without precluding effective use of the insert. Desirably, in the particular structure referred to, the peak diameter 31 of the serrations has a tolerance from .211 inch to .223 inch, while diameter 30 is formed with a .221 drill, having a tolerance from .220 to .225. Consequently, a .003 interference fit is possible, in which case the serration peaks will merely ream out the minor diameter of the carrier part threads very slightly as the serrations are advanced into those threads with slightly increased installation torque. In spite of this possibility for a slight interference fit, such an arrangement is considered, within the terminology of the present application, as having the serrations received substantially entirely within the minor diameter of the carrier part threads.

If the ¼-28 external threads of the specific insert discussed above were completely standard, in accordance with the American Standard thread series, the minor diameter 34 of these threads would be .206 inch. However, this dimension is actually .214 inch, thus showing that the external thread does have a modified minor diameter as stated.

FIG. 8 shows another form of the invention, which may be identical with that of FIGS. 1 through 6 except that the serrations 23b of the insert 11b of FIG. 8 are less deep radially than the corresponding serrations 23 of the first form of the invention, to thus increase the effective radial thickness and strength of the insert wall at its locking portion 22b. This arrangement of FIG. 8 has proven to be the presently preferred form where the material of which the insert is formed is of a type which may tend to tear or break through at the thin wall areas when the locking portion is expanded. Thus, the device of FIG. 8 may be employed with lower grade steels and other materials than can the first form of the invention.

The peaks 24b of serrations 23b of FIG. 8 may have the same maximum diameter as do peaks 24 of FIGS. 1 through 6, with the change in radial thickness of the serrations therefore resulting in radially outward shifting of the minimum diameter portions 25b of the serrations to the location illustrated in FIG. 8, in which valley portions 25b are substantially closer to the minimum diameter surfaces 20b. Preferably, in the arrangement of FIG. 8, the diameter of minimum diameter surfaces 20b is approximately midway between (desirably substantially exactly midway between) the maximum diameter of peaks 24b and the minimum diameter of valleys 25b. The serrations of FIG. 8, by reason of their smaller radial dimension, may be closer together circularly, to provide an increased number of serrations in the same circular distance, and thereby maintain a highly effective locking action with respect to the carrier part, upon expansion of the serrations outwardly into the threads of the carrier part.

To set forth more specifically the presently preferred dimensions of a particular insert constructed in accordance with the showing of FIG. 8, and more particularly an insert having 10-32 internal threads and modified ¼-28 external threads, all of the dimensions of this insert may be considered as identical with those set forth hereinabove for the typical insert of the FIGS. 1 through 6 structure, except that the minimum diameter of the valleys 25b of serrations 23b is increased to .207 inch rather than .201 inch. The serrations therefore have a radial dimension of .007 inch (one-half the difference between their peak diameter .221 inch and their valley diameter .207 inch). The modified minor diameter of the external threads, which as in the prior example is .214 inch, is thus midway between the peak and valley dimensions of the serrations. The wall thickness of locking portion 22b is, by this change in dimension, increased .003 inch to attain the desired increase in strength and resistance to cracking upon expansion. This insert is preferably expanded about .020 inch in diameter, so that each serration moves outwardly .010 inch, which is slightly more than the .007 radial dimension of the serrations, so that even the valleys of the serrations deform the carrier part threads somewhat to maximize the locking action.

The serrations of FIG. 8 may be formed by a knurling tool having projections of the desired radial dimension, and preferably having 47 teeth per inch, to form relatively fine serrations of this character on the insert. The method of installation of the insert of FIG. 8 is of course the same as that previously discussed in connection with FIGS. 1 through 6.

FIG. 9 shows another form of the invention which incorporates some but not all of the features of the earlier forms, and is less effective for use where the material of the insert is subject to cracking or tearing. The insert of FIG. 9 may be considered as identical with that of FIG. 8, except that the counterbore 26c has been shifted radially outwardly to the major diameter of internal threads 17c, so that the internal threads do not continue even in truncated form at the counterbore location. The counterbore is therefore a straight cylindrical surface which is engaged by the expanding tool to expand the locking portion 22c of the insert 11c radially outwardly into locking position. This FIG. 9 arrangement does not add to the strength of the locking portion the strength supplied by the truncated partial threads of FIG. 3, but may in some instances be adequate where extremely high quality metals are employed which are capable of withstanding tearing without this added strength, or where the invention is applied to thicker walled inserts.

As indicated previously, the inserts of the present invention can be effectively locked in place with less expansion than has been required in prior expansible thin walled inserts, and can therefore be formed of less expensive material without danger of tearing or cracking during expansion. Whereas previous thin walled inserts of this general type have had to be formed of 17-4 stainless steel, in order to withstand breakage, I can form my new inserts of such material as 303 stainless steel, which is of lower quality and much less expensive, and which also has the added advantage of being non-magnetic.

I claim:

1. An insert comprising a generally tubular body having external threads adapted to be screwed into a recess in a carrier part and having internal threads for receiving a screw, said external threads having essentially axially extending modified minor diameter surfaces axially between successive turns thereof, said body having an externally unthreaded circularly continuous locking portion at its axially outer end with external serrations projecting radially outwardly therefrom, said serrations tapering radially outwardly to reduced dimension peaks which are elongated generally axially, to a length at least about as great as the pitch of said external threads, and whose maximum diameter is substantially less than the major diameter of the external threads and greater than said modified minor diameter of the external threads, said serrations having valleys between said peaks whose minimum diameters are less than said modified minor diameter of the external threads and greater than the major diameter of said internal threads, said locking portion having an internal counterbore radially opposite said serrations with a minimum diameter less than that of said valleys and less than the major diameter of said internal threads, to be engaged by a tool, and expanded outwardly to force said serrations into locking engagement with the carrier part, said internal threads continuing to the location of said counterbore and forming partial threads at that location truncated by said counterbore intermediate the major and minor diameters of other turns of the internal threads.

2. An insert comprising a generally tubular body having external threads adapted to be screwed into a recess in a carrier part and having internal threads for receiving a screw, said external threads having essentially axially extending modified minor diameter surfaces axially between successive turns thereof, said body having a locking portion at its axially outer end with external serrations projecting radially outwardly therefrom, said serrations having peaks which are elongated generally axially, to a length at least about as great as the pitch of said external threads, and whose maximum diameter is substantially less than the major diameter of the external threads and greater than said modified minor diameter of the external threads, said serrations having valleys between said peaks whose minimum diameters are less than said modified minor diameter of the external threads and greater than the major diameter of said internal threads, said modified minor diameter being approximately midway between said maximum diameter of said peaks and said minimum diameter of said valleys, said locking portion having an internal counterbore radially opposite said serrations with a minimum diameter less than that of said valleys and greater than the minor diameter of said internal threads, to be engaged by a tool and expanded outwardly to force said serrations into locking engagement with the carrier part.

3. The combination comprising a carrier part containing a recess having internal threads, and an element having external threads screwed into said internal threads of the carrier part, said element having a radially expansible essentially tubular locking portion within said threads of the carrier part with serrations formed on its radially outer surface and projecting radially outwardly, said serrations being received substantially entirely within the minor diameter of said internal threads of the carrier part, said serrations having radially outer peaks extending in a direction having a substantial axial component with portions of said peaks located radially opposite the minor diameter portions of said carrier part threads and extending essentially across said minor diameter portions, said serrations having reduced diameter valleys circularly between said peaks, said locking portion of said element having an internal surface radially opposite said serrations against which outward force may be exerted to expand said locking portion and force said serrations outwardly into said carrier part threads.

4. The combination as recited in claim 3, in which said element contains internal threads within and radially opposite said external threads, said internal surface being an essentially axial counterbore surface having a diameter greater than the minor diameter of said internal threads of said element.

5. The combination comprising a carrier part containing a recess having internal threads, and an element having external threads screwed into said internal threads of the carrier part, said element containing internal threads for receiving a screw, said element having a radially expansible essentially tubular and circularly continuous locking portion within said threads of the carrier part with serrations formed on its radially outer surface and projecting radially outwardly, said serrations being received substantially entirely within the minor diameter of said internal threads of the carrier part, said serrations tapering radially outwardly to reduced dimension outer peaks which are elongated in a direction having a substantial axial component at least about as great as the pitch of said carrier part threads and said external threads, with portions of said peaks located radially opposite the minor diameter portions of said carrier part threads and extending essentially across said minor diameter portions, said locking portion of said element having generally axially extending valleys circularly intermediate said peaks at which the external diameter of said locking portion is reduced but at which the material of said portion nevertheless continues circularly to directly connect together successive peaks, said locking portion of said element having an internal surface radially opposite said serrations against which outward force may be exerted to expand said locking portion and force said serrations outwardly into said carrier part threads.

6. The combination comprising a carrier part containing a recess having internal threads with a substantially constant major diameter, and an element having external threads screwed into said recess, said element having an essentially tubular locking portion within said recess with serrations formed integrally on its radially outer surface forming alternate peaks and valleys, said peaks projecting radially outwardly and being expanded into portions of said internal threads of the carrier part to lock the element against unscrewing rotation, said valleys being expanded to a diameter approximately as great as the minor diameter of the carrier part threads, said peaks of the serrations being expanded to a diameter near the major diameter of said carrier part threads, said peaks extending in a direction having a substantial axial component, as great as the pitch of said carrier part threads, said peaks cutting across the entire axial thickness of a radially inner portion of at least one turn of said carrier part threads, from a first side of said turn to its opposite side, to maximize said locking action, said carrier part threads being of essentially the same major and minor diameters at said serrations as at a location offset axially from the serrations except to the extent that the threads are deformed by the serrations.

7. For connection into a carrier part containing a recess having internal threads with a predetermined minor diameter; an element having an axially inner first portion with external threads dimensioned and positioned to be screwed into said internal threads of the carrier part in a predetermined axially inward direction, said element having a radially expansible essentially tubular locking portion axially outwardly of said external threads at a location to follow said external threads into said internal threads, said element having a second set of threads accessible from the axially outer end of said element for connection to another part when said element is received in said recess, said tubular locking portion of the element having serrations formed integrally on its radially outer surface and projecting radially outwardly, said serrations having radially outer peaks which extend in a direction having a substantial axial component and are located to have portions of said peaks received radially opposite the minor diameter portions of said carrier part threads and extending essentially across said minor diameter portions, said peaks of the serrations having a maximum diameter smaller than the major diameter of said external threads, and small enough to be as close substantially to the minor diameter as to the major diameter of the external threads, and of a size to be received essentially within said predetermined minor diameter of the carrier part threads but in close proximity to said carrier part threads, said serrations having valleys circularly between said peaks at which the external diameter of said locking portion is reduced but at which the material of said portion nevertheless continues to directly connect together successive peaks, said locking portion having an essentially axially extending internal surface radially opposite said serrations and against which outward force may be exerted to expand said locking portion and force said serrations outwardly into said minor diameter portions of the carrier part threads, said tubular locking portion being formed of a material and of a thickness to enable said expansion of the serrations into the carrier part threads, without tearing of the locking portion at said valleys or elsewhere and to remain in expanded condition after cessation of said outward force.

8. An element as recited in claim 7, in which the maximum diameter of said peaks is substantially closer to the minor diameter than to the major diameter of said external threads.

9. An element as recited in claim 7, in which said valleys have a minimum diameter less than the minor diameter of the external threads.

10. For connection in to a carrier part containing a recess having internal threads with a predetermined minor diameter; an element having an axially inner first portion with external threads dimensioned and positioned to be screwed into said internal threads of the carrier part in a predetermined axially inward direction, said element having a radially expansible essentially tubular locking portion axially outwardly of said external threads at a location to follow said external threads into said internal threads, said element having a second set of threads accessible from the axially outer end of said element for connection to another part when said element is received in said recess, said tubular locking portion of the element having serrations formed integrally on its radially outer surface and projecting radially outwardly, said serrations having radially outer peaks which extend in a direction having a substantial axial component and are located to have portions of said peaks received radially opposite the minor diameter portions of said carrier part threads and extending essentially across said minor diameter portions, said peaks of the serrations having a maximum diameter at least substantially as great as the minor diameter of said external threads but substantially smaller than the major diameter of said external threads, and substantially closer to the minor diameter than to the major diameter of said external threads, and of a size to be received essentially within said predetermined minor diameter of the carrier part threads but in close proximity to said carrier part threads, said serrations having valleys circularly between said peaks at which the external diameter of said locking portion is reduced but at which the material of said portion nevertheless continues to directly connect together successive peaks, said valleys having minimum diameters less than the minor diameter of said external threads, said locking portion having an essentially axially extending internal surface radially opposite said serrations and against which outward force may be exerted to expand said locking portion and force said serrations outwardly into said minor diameter portions of the carrier part threads, said tubular locking portion being formed of a material and of a thickness to enable said expansion without tearing the locking portion at said valleys or elsewhere and to remain in expanded condition after cessation of said outward force.

11. For connection into a carrier part containing a recess having internal threads with a predetermined minor diameter; an element having an axially inner first portion with external threads dimensioned and positioned to be screwed into said internal threads of the carrier part in a predetermined axially inward direction, said element having a radially expansible essentially tubular locking portion axially outwardly of said external threads at a location to follow said external threads into said internal threads, said element having a second set of threads accessible from the axially outer end of said element for connection to another part when said element is received in said recess, said tubular locking portion of the element having serrations formed integrally on its radially outer surface and projecting radially outwardly, said serrations having radially outer peaks which extend in a direction having a substantial axial component and are located to have portions of said peaks received radially opposite the minor diameter portions of said carrier part threads and extending essentially across said minor diameter portions, said peak of the serrations having a maximum diameter greater than the minor diameter of said external threads but substantially smaller than the major diameter of said external threads and of a size to be received essentially within said predetermined minor diameter of the carrier part threads but in close proximity to said carrier part threads, said serrations having valleys circularly between said peaks at which the external diameter of said locking portion is reduced but at which the material of said portion nevertheless continues to directly connect together successive peaks, said valleys having minimum diameters less than the minor diameter of said external threads, said locking portion having an essentially axially extending internal surface radially opposite said serrations and against which outward force may be exerted to expand said locking portion and force said serrations outwardly into said minor diameter portions of the carrier part threads, said tubular locking portion being formed of a material and of a thickness to enable said expansion without tearing of the locking portion at said valleys or elsewhere and to remain in expanded condition after cessation of said outward force.

12. For connection into a carrier part containing a recess having internal threads with a predetermined modified minor diameter; an element having a generally tubular body with an axially inner first portion which has external threads dimensioned and positioned to be screwed into said internal threads of the carrier part in a predetermined axially inwardly direction, said external threads having essentially axially extending modified minor diameter surfaces axially between successive turns thereof, said body having a radially expansible essentially tubular locking portion axially outwardly of said external threads at a location to follow said external threads into said internal threads, said body having internal threads accessible from the axially outer end of said body for receiving a screw, said tubular locking portion of the body having serrations formed integrally on its radially outer surface and projecting radially outwardly, said serrations having radially outer peaks which extend in a direction having a substantial axial component and are located to have portions of said peaks received radially opposite the minor diameter portions of said carrier part threads and extending essentially across said minor diameter portions, said peaks of the serrations having a maximum diameter smaller than the major diameter of said external threads, and small enough to be as close substantially to the minor diameter as to the major diameter of said external threads, and of a size to be received essentially within said predetermined minor diameter of the carrier part threads but in close proximity to said carrier part threads, said serrations having valleys circularly between said peaks at which the external diameter of said locking portion is reduced but at which the material of said portion nevertheless continues to directly connect together successive peaks, said valleys having minimum diameters less than the modified minor diameter of said external threads and greater than the major diameter of said internal threads of said element, said locking portion having an essentially axially extending internal counterbore radially opposite said serrations and against which outward force may be exerted by a tool to expand said locking portion and force said serrations outwardly into locking engagement with said minor diameter portions of the carrier part threads, said counterbore having a minimum diameter less than that of said valleys and greater than the minor diameter of said internal threads, said tubular locking portion being formed of a material and of a thickness to enable said expansion without tearing the locking portion at said valleys or elsewhere and to remain in expanded condition after cessation of said outward force.

References Cited by the Examiner

UNITED STATES PATENTS

| | | | |
|---|---|---|---|
| 2,092,358 | 9/1937 | Robertson | 29—523 |
| 2,577,810 | 12/1951 | Rosan | 151—41.72 |
| 3,081,808 | 3/1963 | Rosan | 151—41.73 |

CARL W. TOMLIN, *Primary Examiner.*